United States Patent [19]

Sasuta et al.

[11] Patent Number: 5,392,458
[45] Date of Patent: Feb. 21, 1995

[54] TRUNKED COMMUNICATION SYSTEM WITH VARIABLE COMMUNICATION CAPABILITY SUPPORT FOR ROAMERS

[75] Inventors: Michael D. Sasuta, Mundelein; Richard H. Coe, Arlington Heights; Sewim F. Ablay, Hoffman Estates, all of Ill.

[73] Assignee: Motorola, Inc., Schaumburg, Ill.

[21] Appl. No.: 52,845

[22] Filed: Apr. 28, 1993

Related U.S. Application Data

[63] Continuation of Ser. No. 585,435, Sep. 20, 1990, abandoned.

[51] Int. Cl.⁶ ............................................. H04B 7/26
[52] U.S. Cl. ................................. 455/54.1; 455/33.1; 455/56.1; 379/59
[58] Field of Search ............... 455/33.1, 33.2, 33.4, 455/34.1, 34.2, 54.1, 54.2, 56.1; 379/59, 60

[56] References Cited

U.S. PATENT DOCUMENTS 4,775,999  10/1988  Williams ............................ 379/59
4,833,701  5/1989   Comroe et al. ..................... 455/33.2
4,901,340  2/1990   Parker et al. ....................... 379/60

FOREIGN PATENT DOCUMENTS 9013211  11/1990  WIPO .
9105429  4/1991   WIPO .

Primary Examiner—Edward F. Urban
Assistant Examiner—Chi H. Pham
Attorney, Agent, or Firm—Timothy W. Markison

[57] ABSTRACT

In a trunked communication system that supports roaming communication units, communication capabilities in support of the communication activities of the communication unit may be varied from system to system in a controlled manner. This control may be initiated at the instance of the communication unit itself, on a system by system basis (wherein each system maintains a data base and/or retains the capability of contacting a home system for the communication unit), or by a hub that interconnects with each of the trunking systems and which either maintains a data base of preauthorization information or that contacts home systems in order to obtain authorization information.

4 Claims, 4 Drawing Sheets

TRUNKED COMMUNICATION SYSTEM WITH VARIABLE COMMUNICATION CAPABILITY SUPPORT FOR ROAMERS

This is a continuation of application Ser. No. 07/585,435, filed Sep. 20, 1990, and now abandoned.

TECHNICAL FIELD

This invention relates generally to trunked communication systems, and particularly to the support of roaming communication units in such a system.

BACKGROUND OF THE INVENTION

An infrastructure for supporting roaming communication units in a trunked radio communication system is described in U.S. Pat. No. 4,833,701 issued May 23, 1989, to Richard Comroe et al. (hereinafter "Comroe"), which patent is incorporated herein by this reference. The Comroe invention provides for support of a roaming communication unit that roams from a first trunked communication system to a second (as used herein, "trunked communication system" refers generally to a trunked RF system, including those that offer dispatch and cellular service.). Comroe does not address, however, providing variable communication capabilities for that communication unit as it roams from system to system.

For example, in its home system, it may be appropriate to support a wide variety of communication capabilities for a given communication unit. For example, telephone interconnect for a predefined set of authorized area codes may be desirable. When that communication unit roams to a different communication system, however, such authorization may be inappropriate, notwithstanding the inherent capability of the communication unit to initiate and maintain such a communication, and further notwithstanding the potential capability of the new communication system to support such a communication.

Accordingly, a need exists for an improved roaming support methodology that will readily accommodate controlled variability of communication capabilities that are supported on behalf of a roaming unit.

BEST MODE FOR CARRYING OUT THE INVENTION

Figure 1:
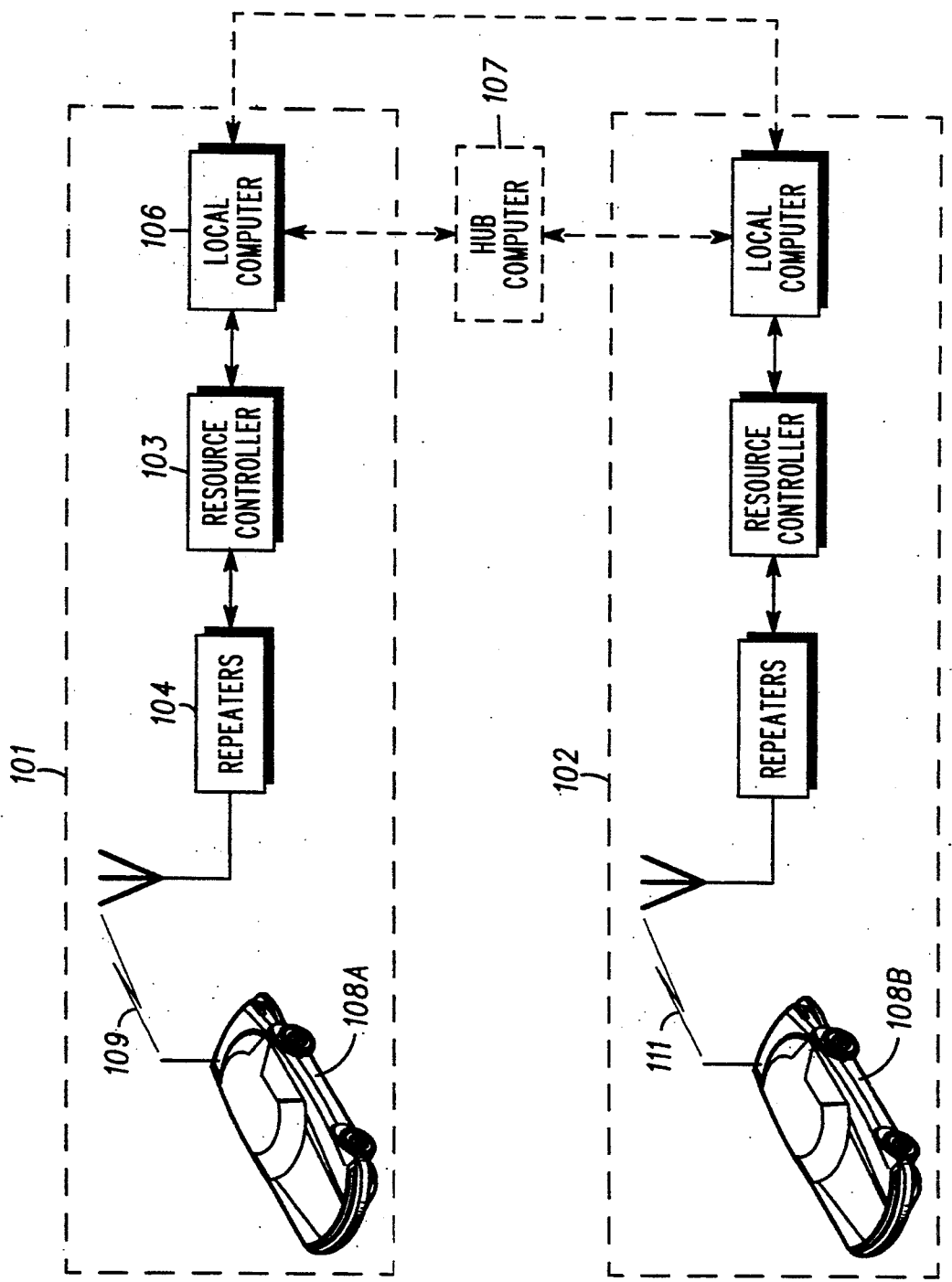
FIG. 1 comprises a block diagram depiction of trunked communication systems configured in accordance with the invention.

For purposes of this description, two substantially identical trunked communication systems (101 and 102) (FIG. 1) are depicted. Though only one will be described for the sake of brevity, it should be understood that any number of trunked communication systems could be similarly configured in accordance with the invention.

Each trunked communication system (101) functions to allocate a plurality of communication resources (such as single frequencies, frequency pairs, and/or TDM time slots, for example) amongst a larger plurality of communication units (108a) (such as vehicle mounted mobile units, personally transported portable units, and fixed location units). To support this activity, the trunked communication system (101) provides a resource controller (103) that receives and processes communication requests from various communication units (108A), and allocates the communication resources in response to such requests. In this embodiment, the various communication resources are supported by a plurality of repeaters (104) that function to receive communications from the communication units, transmit communications from the resource controller (103), and to repeat communications received from the communication units (108a) under control of the resource controller (103). Typically, the number of repeaters (104) will vary from 3 to 20, although other numerical possibilities are available.

Also in this embodiment, the resource controller (103) operably couples to a local computer (106) that can include, for example, a local data base (described below) or that can optionally communicate with a hub computer (107) in a hub based infrastructure, or with other local computers in a distributed network (112), depending upon the configuration selected.

While in the first system (101), a communication unit (108a) will communicate (109) with the infrastructure of the first system (101). When the communication unit moves to the second system (102), however, the communication unit (108b) will no longer be within range of the first system (101), and will therefore communicate with the second system (102) as a roaming unit. Additional detail regarding the infrastructure of the systems, and of the hub (107), in addition to an appropriate methodology for supporting basic communications for the communication unit when it roams, are all set forth in Comroe. Therefore, no additional description need be provided here.

Presuming the first system (101) to be a home system for the communication unit (108a), the home system (101) will typically include a data base that provides a record of all communication capabilities of the communication unit (108a) that are to be supported by the system (101). For example, the communication unit (108a) may have telephone interconnect capability. The system (101) may have telephone interconnect capability as well. The preauthorized communication capabilities for this particular communication unit may therefore include authorization to implement a telephone interconnect call, provided the call is limited to certain area code prefixes. (In other words, although a particular communication unit may be inherently capable of a particular type of communication, and although the system may be inherently capable of supporting such a communication, the right to exercise the capability, and to what degree, is typically controlled pursuant to preauthorization by a system manager.) Other communication capabilities besides telephone interconnect exist as well, of course, including private call, various data transactions, encryption services, and so forth.

For purposes of this description, it will be helpful to describe and characterize various sets of communication capabilities, as follows:

First set of communication capabilities—these are the communication capabilities that the communication unit in question has an inherent ability to support;

Second set of communication capabilities—these are the communication capabilities that a first trunked communication system, such as a home system for the given communication unit, is inherently capable of supporting;

Third set of communication capabilities—these are the communication capabilities that a system manager or other appropriate decision mechanism have preapproved the first communication system to support for use by the communication unit (often, this third set of communication capabilities will be only a subset of the first and second sets of communication capabilities; i.e., often authorization will not exist to support each and every communication capability of both the communication unit itself and of the system);

Fourth set of communication capabilities—these are the communication capabilities that are inherently capable of being supported by a second communication system into which the communication unit roams; and Fifth set of communication capabilities—these are a set of communication capabilities that the communication unit becomes authorized to use, and the second communication system becomes authorized to support, when the communication unit roams into the second communication system.

Pursuant to this invention, there are a variety of ways by which the fifth set of communication capabilities may be derived. The essential point of the invention, however, is to derive this fifth set of communication capabilities.

Figure 2:
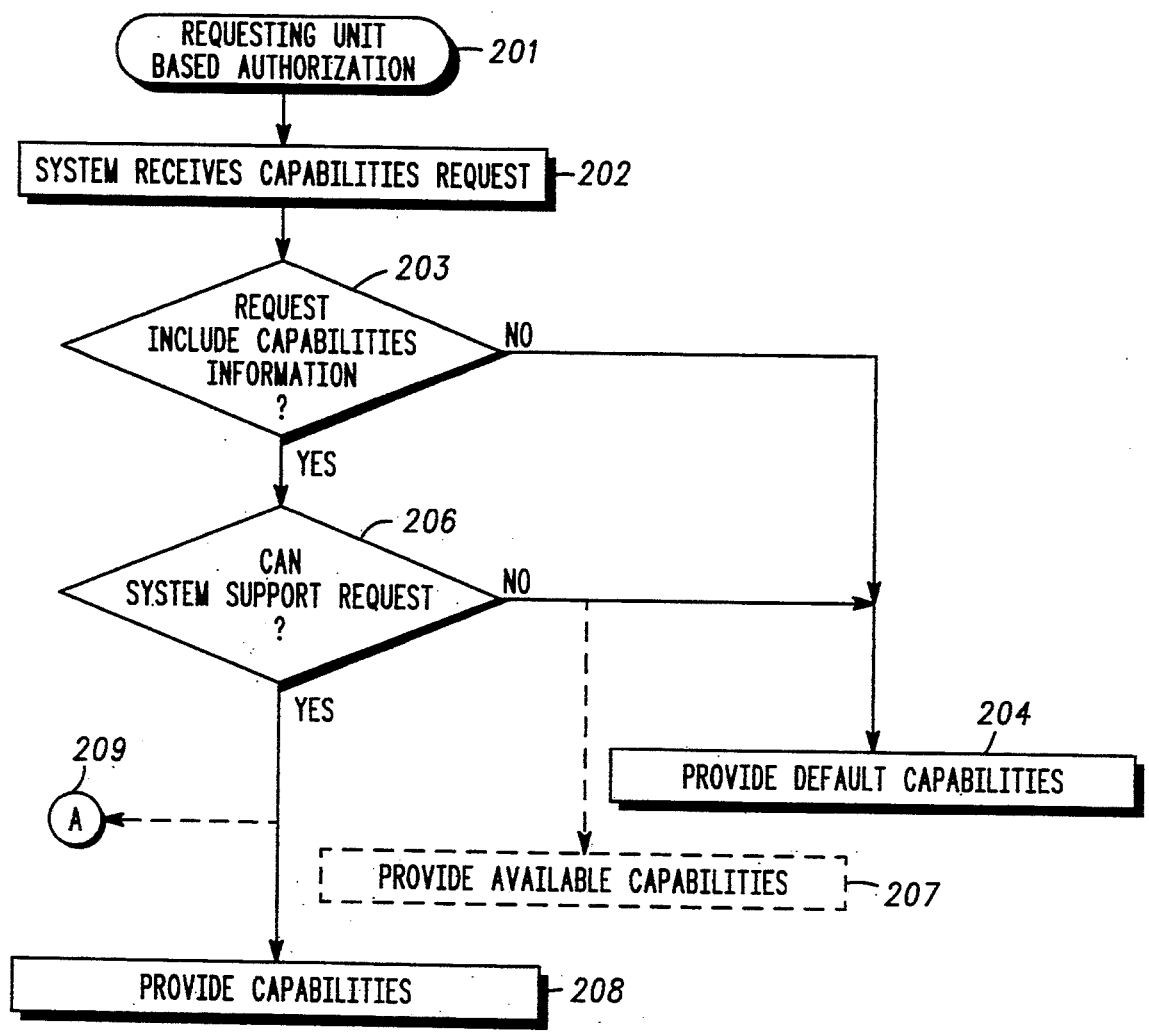
FIG. 2 comprises a flow diagram depicting requesting unit based authorization in accordance with the invention.

A requesting unit based authorization (201) methodology appropriate for use in providing the fifth set of communication capabilities will now be described (FIG. 2). The process begins when the system receives a capabilities request (202) from a communication unit. This request may occur when the communication unit initially contacts the system to establish itself as a roaming user, or may occur at some time subsequent. The process continues with a determination by the system as to whether the capabilities request includes any information from the communication unit as to the specific capabilities requested (203). For example, in this embodiment, the communication unit can be provided with an internal data base that provides either information regarding allowed capabilities in all systems, or in at least certain systems. When so provided, this information can be passed on to the system. If no such capabilities information is provided, the system can simply respond to the capabilities request by providing support for a predetermined set of default capabilities (204).

If, however, the request does include an identification of specific capabilities requested, the system then determines whether all of the capabilities requested can be supported (206). If not, the system can again revert to providing default capabilities only (204), or optionally, can respond by providing support for those requested capabilities that are available in the system (207).

If the system can support all requested capabilities (206), then the system can take the appropriate actions to support the requested capabilities (208).

Figure 3:
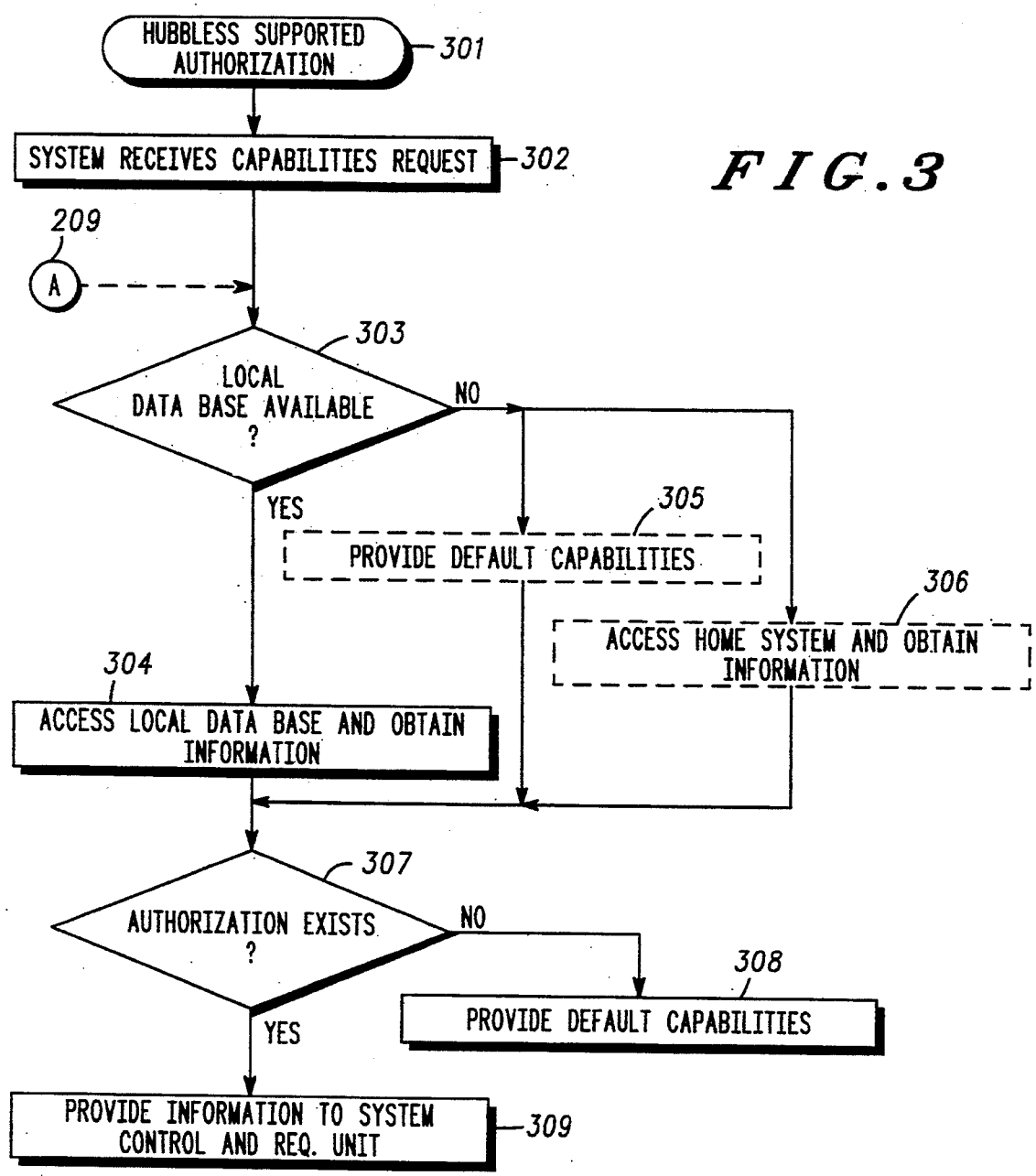
FIG. 3 comprises a flow diagram of hubless supported authorization in accordance with the invention.

A method for providing the fifth set of communication capabilities pursuant to a hubless supported authorization methodology (301) will now be described (FIG. 3). Again, the process begins when the system receives a capabilities request (302). In this embodiment, however, the request may or may not include specific identified capabilities. (If such capabilities are included, then the system can make some or all of the determinations made in the requesting unit based authorization methodology described above to determine what specific capabilities are requested, and whether the system can support such capabilities (209).) Presuming, however, that no such capabilities are identified (or that such capabilities are identified and the system is capable of supporting such requests), the system then determines whether a local data base containing information regarding authorization of such capabilities is available (303). If so, this local data base is accessed and authorization information obtained (304). Otherwise, the system can either provide default capabilities in support of the communication unit (305), or the system can access the home system for the communication unit and obtain appropriate authorization information directly from the home system (306). The latter process presumes, of course, an appropriate interconnection (112) capability between the systems, such as by a data link, as well understood in the art.

Assuming that authorization information can be obtained, from either the local data base (304) or from the home system (306), the system determines what authorizations in fact exist for this particular communication unit (307). If none, default capabilities are provided (308). Presuming, however, that authorization does exist, the appropriate authorization information is provided to the system control and, in the appropriate embodiment, to the requesting unit as well (309). Thereafter, the communication unit may request, and the system may provide, communication capabilities as commensurate with the authorization obtained.

Figure 4:
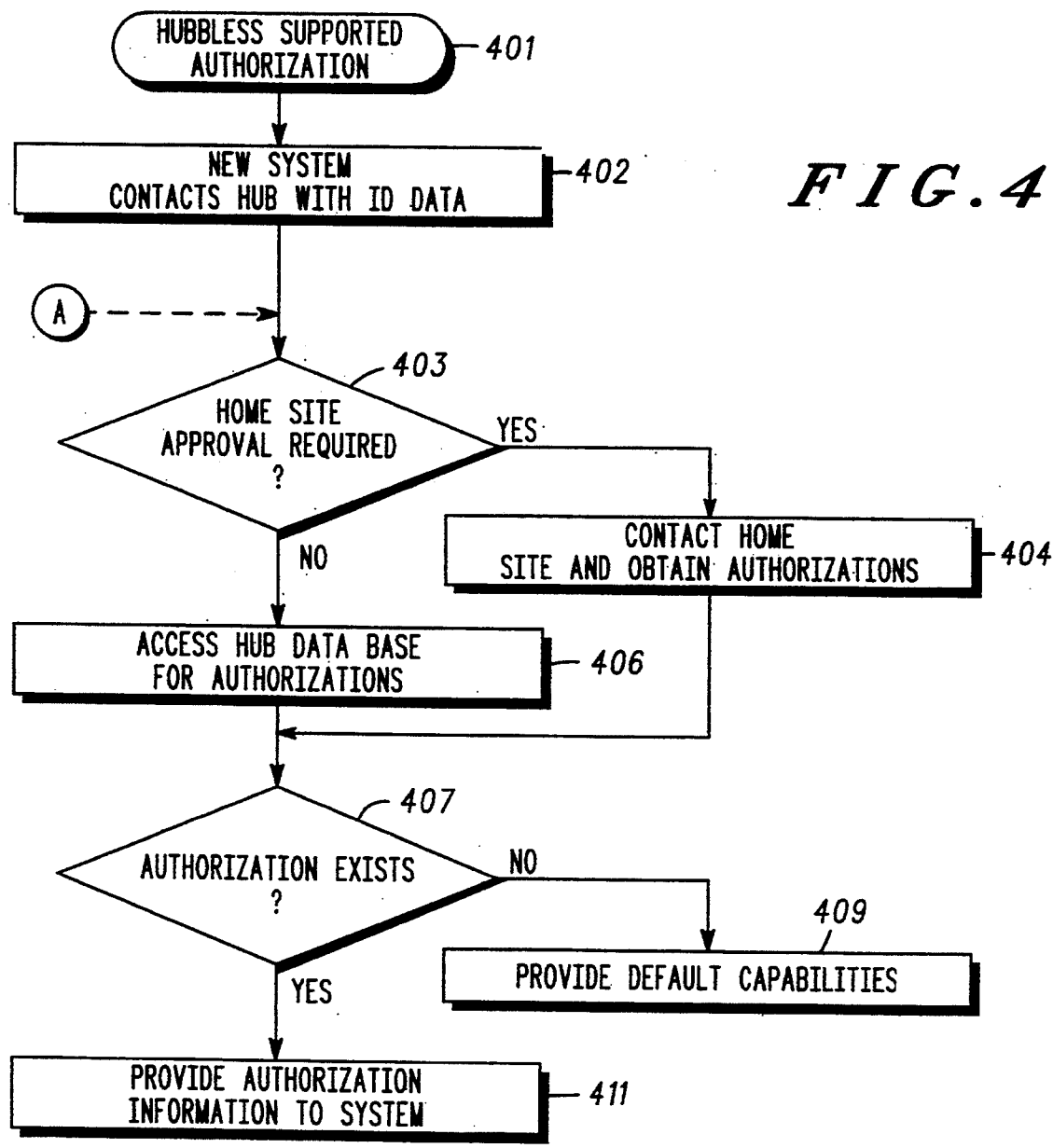
FIG. 4 comprises a flow diagram of hub supported authorization in accordance with the invention.

An appropriate methodology providing communication capabilities authorization in a hub supported authorization (401) scheme will now be described (FIG. 4). In this embodiment, it will be presumed that the various communication systems (101 and 102) are operably coupled to a hub (107) that functions to, among other things, maintain a data base of preauthorizations for various communication units in various communication systems.

When a communication unit contacts a system as a roamer, the new system contacts the hub with ID data specific to the communication unit (402). The hub can then determine whether home site approval for this particular communication unit is required (403). If so, the hub contacts the home site and obtains the appropriate authorizations (404). If homesite approval is not required (403), the hub accesses its internal data base to obtain information regarding previously stored authorizations for this particular communication unit (406).

Once the authorization information has been retrieved, the hub determines whether authorization exists for this communication unit, and if so, to what extent (407). If no authorization information exists, the hub authorizes provision of default capabilities for this communication unit in the requesting system (409). If, however, authorization does exist, the authorization information is provided by the hub to the requesting system (411). Thereafter, the communication unit will operate in the requesting system subject to the authorizations provided by the hub.

What is claimed is:

1. A method for determining communication capabilities of a roaming communication unit, the method comprising the steps of:
   a) Roaming, by the roaming communication unit, from a first communication system to a second communication system;
   b) Transmitting, by the roaming communication unit, a capabilities request to the second communication system;
   c) Receiving, by the second communication system, capability information of the roaming communication unit; and
   d) Determining by the second communication system, a fifth set of communication capabilities for the roaming communication unit based on a fourth set of communication capabilities of the second communication system and the capability information.

2. The method of claim 1 wherein the first communication system is operably coupled to the second communication system, and wherein the step of receiving capability information comprises the steps of:
   1) establishing communication between the second communication system and the first communication system;
   2) providing information to the first system regarding the establishment of communications between the second communication system and the communication unit;
   3) providing, from the first system to the second system, the capability information.

3. The method of claim 1 wherein the second communication system is operably coupled to a remote data base, and wherein the step of receiving capability information comprises the steps of:
   1) establishing communication between the second communication system and the remote data base;
   2) requesting information from the remote data base regarding authorized communication capabilities for the communication unit;
   3) providing, from the remote data base to the second system, the capability information.

4. In the method of claim 1, step c further comprises receiving the capability information from the communication unit, wherein the communication unit includes a data base of a first set of communication capabilities.

* * * * *